United States Patent [19]

Gutleber

[11] Patent Number: 4,568,914
[45] Date of Patent: Feb. 4, 1986

[54] EXPANDED MULTILEVEL NOISE CODE GENERATOR EMPLOYING BUTTING

[75] Inventor: Frank S. Gutleber, Little Silver, N.J.

[73] Assignee: The United States of America as represented by the Secretary of the Army, Washington, D.C.

[21] Appl. No.: 536,064

[22] Filed: Sep. 26, 1983

[51] Int. Cl.⁴ ............................................. H03K 13/24
[52] U.S. Cl. .............................. 340/347 DD; 375/17; 375/25; 375/96
[58] Field of Search .................. 340/347 DD; 375/17, 375/25, 96

[56] References Cited

U.S. PATENT DOCUMENTS 3,461,451  8/1969  Gutleber .
3,634,765  1/1972  Gutleber ............................ 375/96
4,293,953  10/1981  Gutleber .

Primary Examiner—Clifford C. Shaw
Attorney, Agent, or Firm—Anthony T. Lane; Sheldon Kanars; Jeremiah G. Murray

[57] ABSTRACT

Expanded multilevel noise codes are generated of a type termed "code mates" having autocorrelation functions which, upon detection in a matched filter, provide an impulse autocorrelation function. More particularly, expanded multilevel code mate pairs are generated by butting two multi-bit codes comprising a mate pair wherein one of the codes in each expanded mate pair comprises a code having a larger amplitude than the other code and whose position is mutually transposed in the expanded mate pairs and further wherein one of the butted codes is the complement or negative of one of the original or base code mates.

30 Claims, 6 Drawing Figures

EXPANDED MULTILEVEL NOISE CODE GENERATOR EMPLOYING BUTTING

The invention described herein may be manufactured, used and licensed by or for the Government for governmental purposes without the payment to me of any royalties thereon or therefor.

CROSS REFERENCE TO RELATED APPLICATION

This invention is related to the following co-pending application filed in the name of the present inventor:
U.S. Ser. No. 533,183, entitled, "Multilevel Noise Code Mate Pair Generation And Utilization Of Such Codes", filed on Sept. 19, 1983.

FIELD OF THE INVENTION

This invention relates generally to the generation of noise codes having autocorrelation functions which upon detection with a matched filter provide an impulse autocorrelation function and more particularly to the generation and utilization of noise codes mates resulting from the expansion of multilevel code mate pairs by butting.

BACKGROUND OF THE INVENTION

Radio communications systems utilizing multiplexed noise codes are generally known, a typical example being shown and described in U.S. Pat. No. 4,293,953, entitled, "Bi-orthogonal PCM Communications System Employing Multiplexed Noise Codes", which issued to Frank S. Gutleber, the present inventor, on Oct. 6, 1981.

The concept of code expansion for the general class of multiplexed noise codes comprised of code mate pairs having autocorrelation functions which upon detection provide an impulse is also generally known. One known expansion concept involves butting of one code mate with the other code mate, and is a technique disclosed, for example, in U.S. Pat. No. 3,461,451, entitled, "Code Generator To Produce Permutations Of Code Mates", which issued to the present inventor on Aug. 12, 1969.

In the above cross-referenced related application, there is disclosed a pulse code modulation communications system employing multiplexed noise code mate pairs comprising a pair of bi-polar digital code mates having more than one amplitude level. More particularly, the system uses basic code mate pairs of at least two code bits each wherein one code mate is comprised of two signal bits of first and second polarities, one bit of which has a larger amplitude than the other bit and wherein the other code mate is comprised of two signal bits of the second polarity and one bit has a larger amplitude than the other bit. For example, where one code mate comprises a code $a=1$, $0^K$, the other code mate comprises a code $b=0^K$, 0 or 0, $0^K$ where K is a predetermined signal gain factor, i.e. an amplitude multiplying term.

Accordingly, it is an object of the present invention to provide an improvement in the generation and utilization of noise codes in communications systems.

Another object of the invention is to provide an improvement in noise coded communications systems employing noise code mate pairs having autocorrelation functions which upon detection in a matched filter compress to an impulse.

Still another object of the invention is to provide a pulse code modulation communications system employing multiplexed code mate pairs having more than one amplitude level.

These and other objects are achieved by the generation of code mate pairs comprising a pair of expanded noise code mates having code portions of more than one amplitude level and which are generated by butting noise code mates of different amplitude levels such that mutually transposed butted code mates in the expanded code mate pairs have respective code bits which are amplified by a predetermined gain factor and wherein one of the butted code mates comprises the complement or negative of one of the original code mates. For example, where a basic code mate comprises code $a=a_1, a_2, a_3 \ldots a_n$ and the other basic code mate comprises code $b=b_1, b_2, b_3 \ldots b_n$, an expanded mate pair is formed by butting codes a and b to form code $A=a, b^K$ and code $B=a^K, \bar{b}$ where the exponent represents the amplification factor of the code bits of codes a and b, $\bar{b}$ represents the complement or the negative of code b and the comma signifies that code b is butted to code a.

DESCRIPTION OF THE PREFERRED EMBODIMENT

Figure 1:
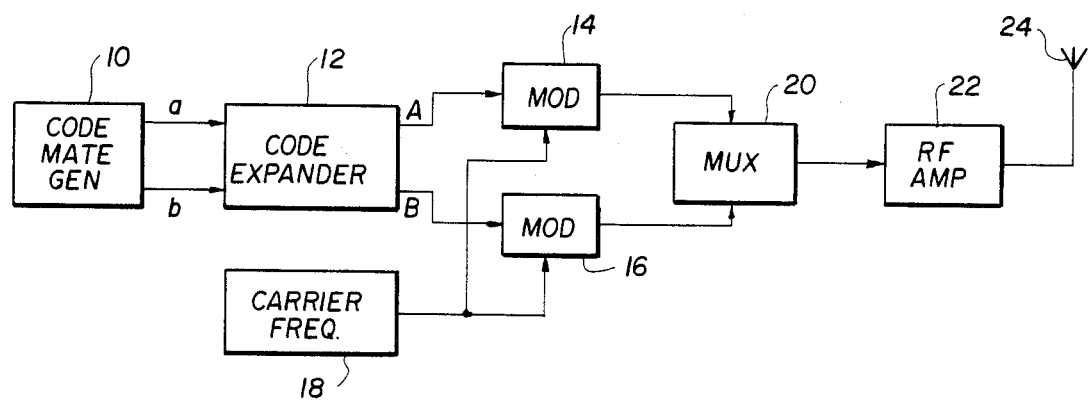
FIG. 1 is a functional block diagram illustrative of the transmitter apparatus of a noise modulated communications system utilizing a pair of expanded code mates generated in accordance with the principles of the invention.

The present invention is directed to digital codes referred to as noise codes, meaning that the information is coded with a code that is "noise like" in that it will compress to an impulse when detected with a matched filter. In particular, one class of noise codes are known wherein pairs of coded signals termed "code mates" have autocorrelation functions which provide a peak output at a given time and a zero output or outputs having the same magnitude but opposite polarity, at all other times. When code mate signals, for example, are multiplexed, matched filter detected and linearly added, there is provided a lobeless impulse output of relatively high amplitude at one given time ($\tau=0$) and a zero output at all other times ($\tau \neq 0$). Mathematically, for a pair of code mates a and b, $$\theta_a(\tau) = -\theta_b(\tau) \tag{1}$$

for all $\tau \neq 0$ where $\theta_a(\tau)$ is the autocorrelation function of code a, $\theta_b(\tau)$ is the autocorrelation function of code b, and wherein $\tau=0$ is the location of the main lobe.

The present invention is furthermore directed to the expansion and utilization of multilevel code mate pairs which not only meet the requirement of equation (1), but which are generated by butting equal length code mates a and b where, for example, $a=a_1, a_2, a_3 \ldots a_n$ and $b=b_1, b_2, b_3 \ldots b_n$ in accordance with the following general rule:

$$A = a, b^K \tag{2}$$

$$B = a^K, \overline{b} \tag{3}$$

where the exponent K signifies an amplitude gain factor of the code bits $a_1 \ldots a_n$ and $b_1 \ldots b_n$, $\overline{b}$ represents the complement or negative of code b and wherein the comma signifies that the second code portion of each expanded code mate A and B follows the end of the first code portion a by having a time delay ($\tau$) which is equal to the code length of code a. Further in the expansion process signified by equations (2) and (3), either code a or b of expanded codes A or B may be negative i.e. $\overline{a}$ or $\overline{b}$ as long as one of the code portions comprises a complement thereof, as evidenced by the following equations:

ti Code $A = \overline{a}, \overline{b^K}$ (4)

Code $B = \overline{a^K}, b$ (5)

Furthermore, the code portions a and b which are amplified by the gain factor K may, when desired, be transposed in the following manner:

Code $A = a^K, b$ (6)

Code $B = a, \overline{b^K}$ (7)

To verify that the subject expansion process satisfies equation (1), the following examples will now be presented. First consider an expansion process utilizing the following code mate pairs a and b:

$a = 1\ 0$ and $b = 0\ 0$ where 0 represents a positive pulse of unit amplitude and 1 represents a negative pulse of unit amplitude. To prove that this code pair meets the requirements for forming a mate pair, the autocorrelation function $\theta_a(\tau)$ of code a can be developed in a matched filter detector in the following fashion:

$$\theta_a(\tau) = \begin{array}{cccc} 1 & 0 & & \\ & 0 & 1 & \\ \hline 1 & 0^2 & 1 & \\ & \uparrow & & \\ & \tau = 0 & & \end{array} \tag{8}$$

In the same manner, the autocorrelation function $\theta_b(\tau)$ of code b can be developed in its corresponding matched filter as:

$$\theta_b(\tau) = \begin{array}{cccc} 0 & 0 & & \\ & 0 & 0 & \\ \hline 0 & 0^2 & 0 & \\ & \uparrow & & \\ & \tau = 0 & & \end{array} \tag{9}$$

From equations (8) and (9), it can be seen that $\theta_a(\tau) = -\theta_b(\tau)$ for all $\tau \neq 0$ and furthermore when added together, compress to a lobeless impulse at $\tau = 0$ when linearly added together. This is furthermore shown below as:

$$\begin{array}{c} \theta_a(\tau) = 1 \quad 0^2 \quad 1 \\ \theta_b(\tau) = 0 \quad 0^2 \quad 0 \\ \hline \theta_T = \theta_a(\tau) + \theta_b(\tau) = \cdot \quad 0^4 \quad \cdot \\ \uparrow \\ \tau = 0 \end{array} \tag{10}$$

Now applying the expansion process in accordance with equations (2) and (3), there results an expanded mate pair A and B as follows:

Code $A = 1\ 0\ 0^K\ 0^K$ (11)

Code $B = 1^K\ 0^K\ 1\ 1$ (12)

Now compressing code A as before yields:

$$\theta_A(\tau) = \begin{array}{cccccc} 1^K & 0^K & 0^{K^2} & 0^{K^2} & & \\ & 1^K & 0^K & 0^{K^2} & 0^{K^2} & \\ & & 1 & 0 & 0^K & 0^K \\ & & & 0 & 1 & 1^K & 1^K \\ \hline 1^K & \cdot & 0^{K^2+K-1} & 0^{2(K^2+1)} & 0^{K^2+K-1} & \cdot & 1^K \end{array} \tag{13}$$

And compressing code B in the same fashion yields:

$$\theta_B(\tau) = \begin{array}{cccccc} 0^K & 1^K & 0 & 0 & & \\ & 0^K & 1^K & 0 & 0 & \\ & & 1^{K^2} & 0^{K^2} & 1^K & 1^K \\ & & & 0^{K^2} & 1^{K^2} & 0^K & 0^K \\ \hline 0^K & \cdot & 1^{K^2+K-1} & 0^{2(K^2+1)} & 1^{K^2+K-1} & \cdot & 0^K \end{array} \tag{14}$$

The addition of $\theta_A(\tau)$ and $\theta_B(\tau)$ provides a composite signal $\theta_T(\tau)$ which provides a lobeless signal at $\tau = 0$ as shown below.

$$\begin{array}{c} \theta_A(\tau) = 1^K \quad \cdot \quad 0^{\overline{K^2}+K-1} \quad 0^{2(K^2+1)} \quad 0^{K^2+K-1} \quad \cdot \quad 1^K \\ \theta_B(\tau) = 0^K \quad \cdot \quad 1^{K^2+K-1} \quad 0^{2(K^2+1)} \quad 1^{K^2+K-1} \quad \cdot \quad 0^K \\ \hline \theta_T(\tau) = \cdot \quad \cdot \quad \cdot \quad 0^{4(K^2+1)} \quad \cdot \quad \cdot \quad \cdot \\ \uparrow \\ \tau = 0 \end{array} \tag{15}$$

Consider now the following code mate pair where $a = 1\ 0\ 0\ 0$ and $b = 0\ 1\ 0\ 0$.

Applying the same expansion technique to this code pair results in:

Code $A = 1\ 0\ 0\ 0\ 0^K\ 1^K\ 0^K\ 0^K$ (16)

Code $B = 1^K\ 0^K\ 0^K\ 1\ 0\ 1\ 1$ (17)

Repeating the same compression process for codes A and B yields:

$$
\begin{array}{cccccccccccc}
1^K & 0^K & 0^K & 0^K & 0^{K2} & 1^{K2} & 0^{K2} & 0^{K2} \\
& 1^K & 0^K & 0^K & 0^K & 0^{K2} & 1^{K2} & 0^{K2} & 0^{K2} \\
& & 0^K & 1^K & 1^K & 1^K & 1^{K2} & 0^{K2} & 1^{K2} & 1^{K2} \\
& & & 1^K & 0^K & 0^K & 0^K & 0^{K2} & 1^{K2} & 0^{K2} & 0^{K2} \\
& & & & 1 & 0 & 0 & 0 & 0^K & 1^K & 0^K & 0^K \\
& & & & & 1 & 0 & 0 & 0 & 0^K & 1^K & 0^K & 0^K \\
& & & & & & 1 & 0 & 0 & 0 & 0^K & 1^K & 0^K & 0^K \\
& & & & & & & 0 & 1 & 1 & 1 & 1^K & 0^K & 1^K & 1^K \\
\hline
\end{array}
$$

$$\theta_A(\tau) = 1^K \ . \ 0^{3K} \ . \ 0^{K2+K-1} \ . \ 1^{K2-K-1} \ 0^{4(K2+1)} \ 1^{K2-K-1} \ . \ 0^{K2+K-1} \ . \ 0^{3K} \ . \ 1^K$$

and, $$
\begin{array}{cccccccccccc}
0^K & 1^K & 1^K & 1^K & 0 & 1 & 0 & 0 \\
& 0^K & 1^K & 1^K & 1^K & 0 & 1 & 0 & 0 \\
& & 1^K & 0^K & 0^K & 0^K & 1 & 0 & 1 & 1 \\
& & & 0^K & 1^K & 1^K & 1^K & 0 & 1 & 0 & 0 \\
& & & & 1^{K2} & 0^{K2} & 0^{K2} & 0^{K2} & 1^K & 0^K & 1^K & 1^K \\
& & & & & 1^{K2} & 0^{K2} & 0^{K2} & 0^{K2} & 1^K & 0^K & 1^K & 1^K \\
& & & & & & 1^{K2} & 0^{K2} & 0^{K2} & 0^{K2} & 1^K & 0^K & 1^K & 1^K \\
& & & & & & & 0^{K2} & 1^{K2} & 1^{K2} & 1^{K2} & 0^K & 1^K & 0^K & 0^K \\
\hline
\end{array}
$$

$$\theta_B(\tau) = 0^K \ . \ 1^{3K} \ . \ 1^{K2+K-1} \ . \ 0^{K2-K-1} \ 0^{4(K2+1)} \ 0^{K2-K-1} \ . \ 1^{K2+K-1} \ . \ 1^{3K} \ . \ 0^K$$

which proves that this pair of expanded codes meets the requirements of equation (1) for forming a mate pair, since the sum of their autocorrelation functions compresses to a lobeless impulse as shown below:

$$\theta_A(\tau) = 1^K \ . \ 0^{3K} \ . \ 0^{K2+K-1} \ . \ 1^{K2-K-1} \ 0^{4(K2+1)} \ 1^{K2-K-1} \ . \ 0^{K2+K-1} \ . \ 0^{3K} \ . \ 1^K$$
$$\theta_B(\tau) = 0^K \ . \ 1^{3K} \ . \ 1^{K2+K-1} \ . \ 0^{K2-K-1} \ 0^{4(K2+1)} \ 0^{K2-K-1} \ . \ 1^{K2+K-1} \ . \ 1^{3K} \ . \ 0^K$$
$$\theta_T(\tau) = \ . \quad \quad \quad \quad \quad \quad \quad 0^{8(K2+1)} \ . $$

Figure 2:
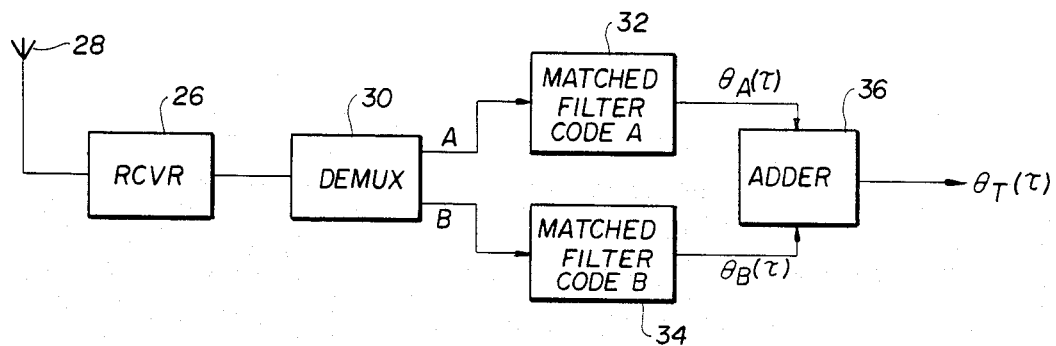
FIG. 2 is a functional block diagram illustrative of the receiver apparatus of the noise modulated communications system for receiving and detecting the expanded code mate pairs generated in accordance with the principles of this invention.
Figure 3:
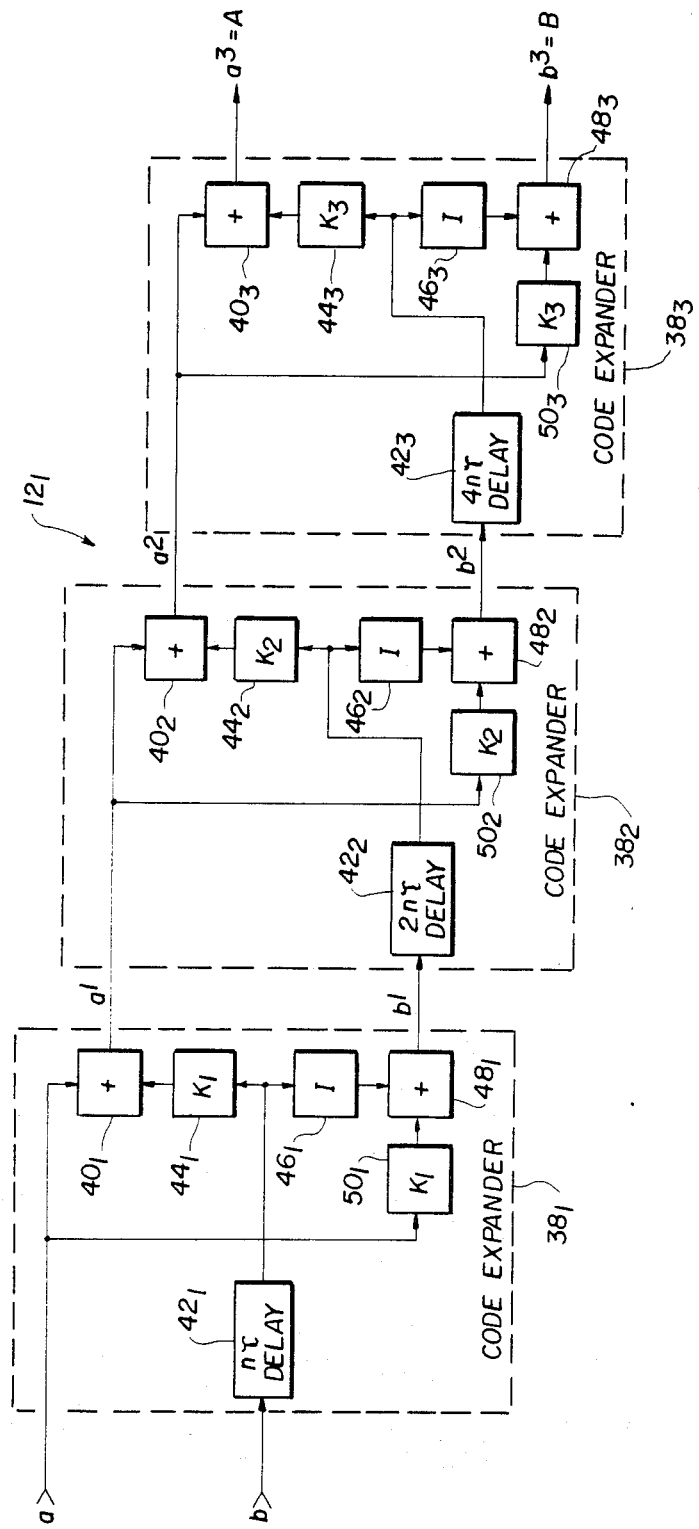
FIG. 3 is a first embodiment of a code mate expander shown in FIG. 1.
Figure 5:
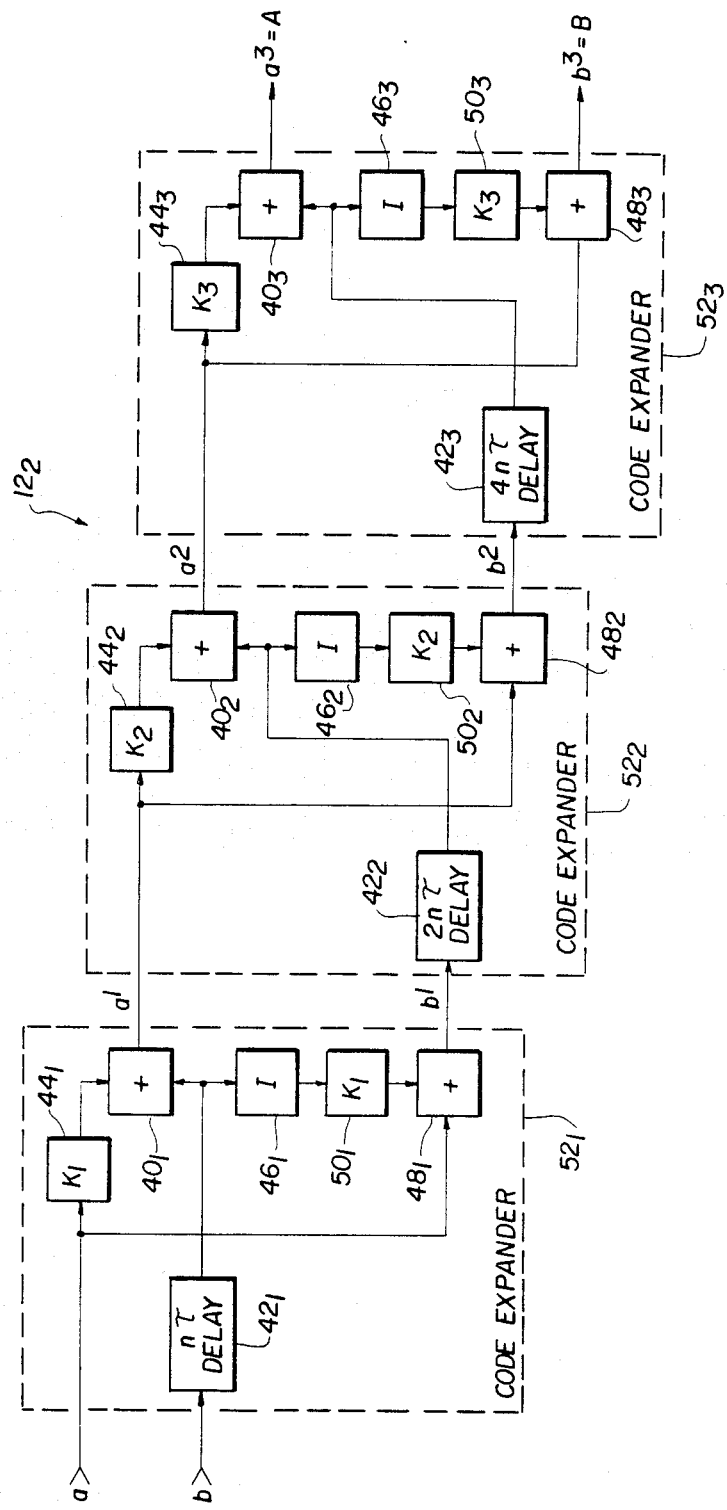
FIG. 5 is a second embodiment of the code expander shown in FIG. 1.
Figure 6:
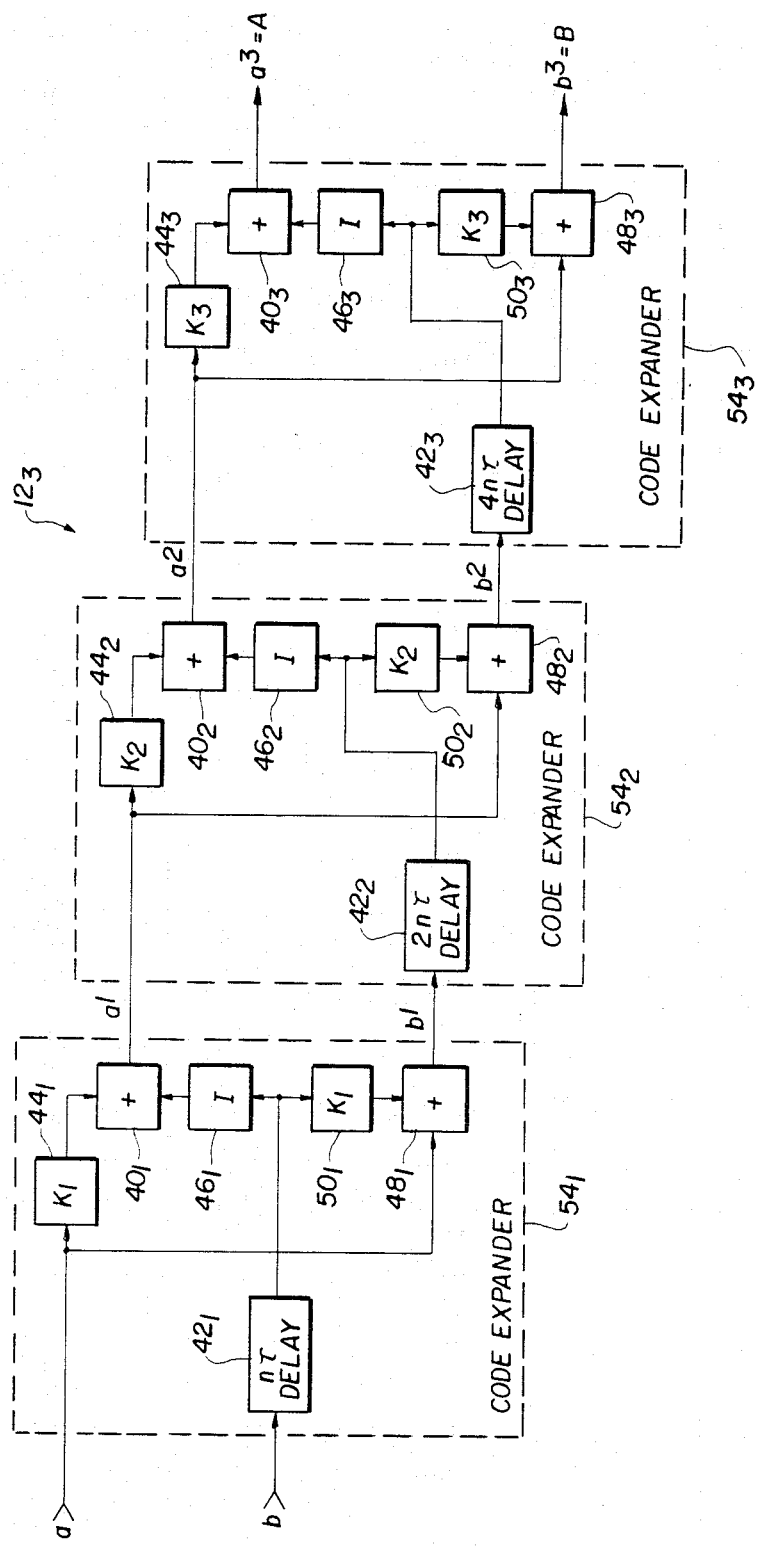
FIG. 6 is a third embodiment of the code expander shown in FIG. 1.

Apparatus for expanding multilevel noise codes for providing expanded code mate pairs in accordance with the subject invention is shown in FIGS. 3, 5 and 6, while a noise modulated pulse communications system employing such codes is typically disclosed in FIGS. 1 and 2.

Referring first to FIG. 1, reference numeral 10 denotes a basic code mate generator for generating code mates a and b and which are utilized to generate expanded codes A and B in accordance with the foregoing description. The codes a and b are outputted in a time related multibit binary digital sequence to code expander apparatus designated by reference numeral 12 and which comprises the subject matter of FIGS. 3, 5 and 6. The expanded codes A and B are applied to respective modulator circuits 14 and 16 which additionally have applied thereto a carrier frequency generated by a carrier frequency generator 18. The outputs of the modulators 14 and 16 comprise, for example, separate bi-phase modulated codes which are fed to a multiplexer 20 which operate to either time or frequency multiplex and carrier modulated signals A and B. The output of the multiplexer 20 is fed to an RF amplifier 22 where an RF carrier containing the multiplexed codes A and B are radiated from.

With respect to FIG. 2, there is disclosed receiver apparatus which is responsive to the RF signal radiated from the antenna 24 and containing the codes A and B. Accordingly, the radio receiver apparatus 26 is shown coupled to a receiving antenna 28 which is operable to translate the multiplexed codes A and B at the RF frequency to an IF frequency whereupon they are fed to a demultiplexer 30. The demultiplexer is operable to output the codes A and B separately where they are applied to respective matched filters 32 and 34. The matched filters 32 and 34 are typically of the types shown and described in the aforementioned U.S. Pat. No. 4,283,953 and operate to compress codes A and B as described above, to provide respective autocorrelation function outputs $\theta_A(\tau)$ and $\theta_B(\tau)$. The autocorrelation function output of the matched filters 32 and 34 are applied to a linear adder 36 which is operable to develop a substantially lobeless impulse output signal $\theta_T(\tau)$.

Referring now to the figures which disclose illustrative embodiments of the code expander 12 shown in FIG. 1, reference will first be made to FIG. 3 wherein there is disclosed an embodiment of a code expander $12_1$ comprised of three code expander stages $38_1$, $38_2$ and $38_3$, each of which separately implement the expansion process in accordance with equations (2) and (3). Considering the first expander stage $38_1$, two equal length base code mates a and b comprising multiple code bits of the same pulse amplitude are respectively coupled to a first linear adder $40_1$ and a time delay device $42_1$. The time delay device typically comprises a delay line which is operable to provide a delay $n\tau$ which is equal to the length of the basic codes a and b comprised of n pulses of pulsewidth $\tau$. The output of the time delay device $42_1$ is fed to a pulse amplifier $44_1$ having a predetermined gain of $K_1$. The amplifier $44_1$ operates to amplify the delayed code b which is then applied to the first linear adder $40_1$ which generates an expanded code mate $a^1$ in accordance with equation (2). The output of the time delay device $42_1$ is concurrently coupled to a signal inverter $46_1$ which is operable to change the polarity of a positive pulse to a negative pulse and vice versa and thus outputs the complement of negative of code b, i.e. $\bar{b}$. The complement of code b or $\bar{b}$ is fed to a second linear adder $48_1$ along with the output of a second pulse amplifier $50_1$ whose input is coupled to the code a and also provides a gain of $K_1$ to the base code a. The second linear adder $48_1$ accordingly provides an output of an expanded code mate $b^1$ in accordance with equation (3).

The second expander stage $38_2$ is identical to the first stage $38_1$ with the exception that the time delay device $42_2$ provides a time delay of $2n\tau$ which is the code length of the expanded code mates $a^1$ and $b^1$. This is graphically shown by the timing diagram of FIG. 4. Additionally, the gain of the two pulse amplifiers $44_2$ and $50_2$ have a gain of $K_2$ which may or may not be equal to the gain $K_1$ of the first stage. Accordingly, the code expander stage $38_2$ provides further code expanded code mate pairs $a^2$ and $b^2$ having twice the code length of the expanded codes $a^1$ and $b^1$.

Figure 4:
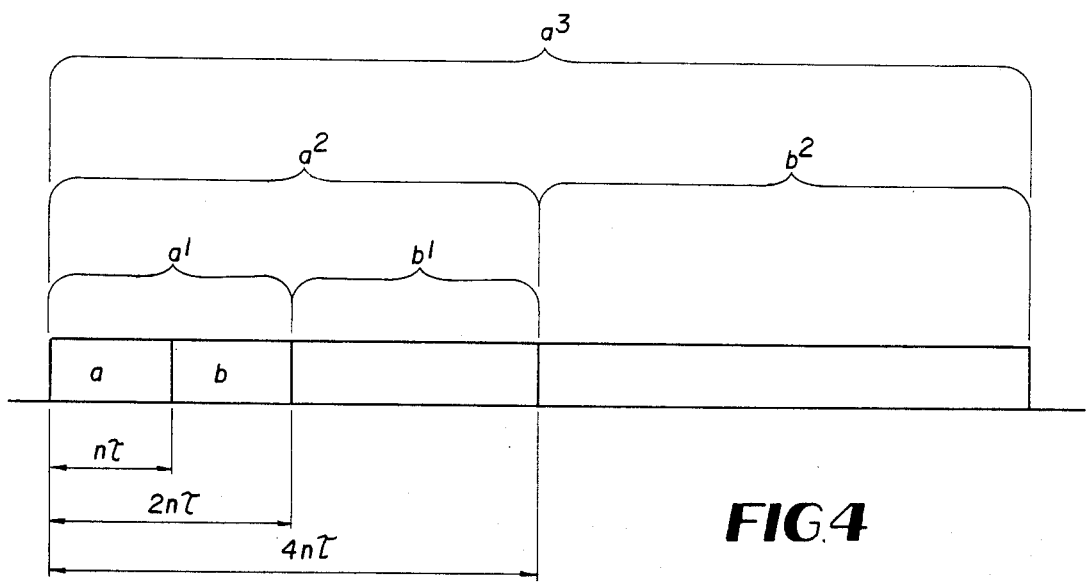
FIG. 4 is a diagram illustrative of the expansion of code mates by butting in accordance with the invention.

The third code expansion stage $38_3$ again is identical to the two previous expansion stages $38_1$ and $38_2$ with the exception that now the time delay device $42_3$ provides a time delay of $4n\tau$ and the gain $K_3$ of the pulse amplifier stage $44_3$ and $50_3$ may or may not be equal to the gains $K_1$ and/or $K_2$ of the previous stages. Further as shown in FIG. 4, the time delay of $4n\tau$ permits the two expanded code mates $a^2$ and $b^2$ to be butted together so that expanded code mates $a^3 = A$ and $b^3 = B$ are generated in accordance with equations (2) and (3).

The code structure thus developed is mathematically shown below:

$\left.\begin{array}{c} a \\ b \end{array}\right\}$ = basic code mate pair $a' = a, b^{K1}$ $b' = a^{K1}, \overline{b}$ $a^2 = a, b^{K1}, a^{K1K2}, b^{\overline{K2}}$ $b^2 = a^{K2}, b^{K1K2}, a^{\overline{K1}}, b$ $a^3 = A = a, b^{K1}, a^{K1K2}, b^{\overline{K2}}, a^{K2K3}, b^{K1K2K3}, a^{\overline{K1K3}}, b^{K3}$ $b^3 = B = a^{K3}, b^{K1K3}, a^{K1K2K3}, b^{\overline{K2K3}}, b^{\overline{K2}}, b^{\overline{K1K2}}, a^{K1}, \overline{b}$ Referring now to a second embodiment of a code expander for generating multilevel butted code mates, reference is now made to FIG. 5 where there is shown a code expander $12_2$ comprised of three code expander stages $52_1$, $52_2$ and $52_3$ which implement a code structure as defined by equations (6) and (7), that is where amplified codes of the basic code mates a and b are transposed. This merely involves reconnection of the two amplifiers $44_1 \ldots 44_3$ and $50_1 \ldots 50_3$ in the code expansion stages $52_1$, $52_2$ and $52_3$. Thus as shown in FIG. 5, the first pulse amplifier $44_1$ is directly coupled to the basic code a which is now also connected to the second linear adder $48_1$. The basic code mate b as before is fed to the $n\tau$ delay device $42_1$, the output of which is concurrently fed to the first linear adder $40_1$ and the code inverter $46_1$. Now the first linear adder $40_1$ outputs a first expanded code mate of $a' = a^{K1}$, b. The second linear adder $48_1$ has applied thereto a delayed, inverted and amplified code b which provides an expanded output code mate $b^1$ of $b' = a, \overline{b}^K$. The second code expansion stage $52_2$ provides expanded code mates $a^2$ and $b^2$ whereupon they are applied to the third expander stage $52_3$ which provides expanded code mates $a^3 = A$ and $b^3 = B$ as defined by equations (6) and (7).

Referring now to FIG. 6, there is disclosed an embodiment of a code expander $12_3$ which is similar to the code expander of FIG. 5 in that transposition of amplified code segments is provided but now additionally the second set of the first expanded code mate is inverted rather than the second code mate in accordance with the following equations:

$$A = a^K, \overline{b} \quad (21)$$

$$B = a, b^K \quad (22)$$

These two equations in effect are analogous to and are equivalent to equations (4) and (5) and wherein it was stated that any one of the four code segments of an expanded code may be inverted relative to the other three code segments to provide butted expanded codes and still satisfy equation (1).

The embodiment of a code expander implementing equations (21) and (22) as shown in FIG. 6 comprises a code expander $12_3$ which is shown including three code expander stages $54_1$, $54_2$ and $54_3$ which are substantially the same as the code expander stages $52_1$, $52_2$ and $52_3$ of the code expander $12_2$ which discloses the concept of transposition with the exception now the pulse inverters $46_1 \ldots 46_3$ now couple delayed and inverted b codes to the first linear adders $40_1 \ldots 40_3$, respectively. In each case the outputs of the three expander stages $54_1$, $54_2$ and $54_3$ satisfy equations (21) and (22) with the output of the third stage being a three times expanded code mate pair A and B.

Thus what has been shown and described is the concept of expanding multilevel code mate pairs by butting two code mate pairs that provide autocorrelation functions of codes that are equal in magnitude but of opposite sense for all values of time delay $\tau$ except at $\tau = 0$. The use of such codes enables the implementation of systems that compress a coded signal to a lobeless impulse.

Moreover, these noise codes can, when appropriately utilized, improve the entire field of communications since they are capable of optimizing all transmission systems including not only communications systems, but also multiple access systems, radar systems, altimeters, fuzes, missile guidance, navigation, traffic control, etc. by reducing self interference, providing anti-jam (A/J) protection, low probability of intercept (LPI) as well as providing increased range and velocity resolution and their measurement accuracy.

Having thus shown and described what is at present considered to be the preferred method and means for implementing the subject invention, it is noted that the same has been made by way of illustration and not limitation. Accordingly, all modifications, alterations and substitutions may be made without departing from the spirit and scope of the invention as set forth in the appended claims.

I claim:

1. A method of expanding a pair of digital codes, comprising the steps of:

generating first and second time coincident digital codes of a first amplitude;

generating a third code comprising the complement of one of said first and second codes;

selectively altering the amplitudes of two codes selected from said first, second and third codes to provide first and second codes of a second amplitude;

generating a first expanded code comprised of first and second butted code portions by selectively combining a said first code of first amplitude with a said second code of second amplitude;

generating a second expanded code comprised of first and second butted code portions by selectively combining a said first code of second amplitude with a said second code of first amplitude, and wherein one code portion of said code portions of said first and second expanded codes comprises said third code, said third code further being selectively of a first or second amplitude.

2. The method of claim 1 wherein said one code portion comprises the second code portion of said second expanded code.

3. The method of claim 1 wherein said one code portion comprises the second code portion of said first expanded code.

4. The method of claim 1 wherein said first and second codes comprise multibit digital codes of equal code length and wherein said second amplitude is greater than said first amplitude by a predetermined gain factor.

5. The method of claim 4 wherein said first and second digital codes comprise a pair of noise codes.

6. The method of claim 5 wherein said first and second codes comprise digital noise codes which upon matched filter detection produces an impulse autocorrelation function.

7. The method of claim 6 wherein said first and second noise codes are comprised of a pair of noise code mates which upon autocorrelation function detection and addition compress to a lobeless impulse and wherein said first and second expanded codes comprise a pair of equal length code mates which also compress to a lobeless impulse upon autocorrelation function detection.

8. The method of claim 7 wherein said step of generating said first expanded code comprises delaying said second code of second amplitude by a time equal to the code length of said first and second codes to provide a delayed code and adding it to the end of said first code to provide thereby said first and second butted code portions of a first code mate, and wherein said step of generating said second expanded code comprises delaying said second code of first amplitude by a time delay equal to the code length of said first and second codes to provide a delayed code and adding it to the end of said first code of second amplitude to thereby provide said first and second butted code portions of a second code mate.

9. The method of claim 8 wherein said one code portion of said first and second expanded codes comprises one of said delayed codes.

10. The method of claim 9 wherein said one delayed code comprises the delayed code of said second expanded code.

11. The method of claim 10 wherein said one delayed code comprises a delayed code of first amplitude.

12. The method of claim 11 wherein said one code portion of said first and second expanded codes comprises the second code portion of said first expanded code.

13. The method of claim 11 wherein said one code portion of said first and second expanded code comprises the second code portion of said second expanded code.

14. The method of claim 13 wherein said second code portion of said second expanded code is of said second amplitude.

15. The method of claim 7 wherein said step of generating said first expanded code comprises delaying said first code of first amplitude by a time delay equal to the length of said first and second codes and adding it to the end of said second code of said second amplitude to provide thereby said first and second code butted code portions of a first code mate, and wherein said step of generating said second expanded code comprises delaying said first code of second amplitude by a time delay equal to the code length of said first and second codes and adding it to the end of said second code of first amplitude providing thereby said first and second butted code portions of a second code mate.

16. Apparatus for generating a pair of expanded digital codes from a first pair of digital codes, comprising in combination:

means for generating first and second time coincident digital codes of a first amplitude;

means for generating a third code comprising the complement of one of said first and second codes;

means for selectively altering the amplitudes of two codes selected from said first, second and third codes to provide first and second codes of a second amplitude;

means for generating a first expanded code comprised of first and second butted code portions including a said first code of first amplitude and a second said code of second amplitude;

means for generating a second expanded code comprised of first and second butted code portions including a said first code of second amplitude with a said second code of first amplitude, and wherein said one code portion of said butted code portions of said first and second expanded codes comprises said third code, said third code further being selectively of a first or second amplitude.

17. The apparatus of claim 16 wherein said one code portion comprises the second butted code portion of said second expanded code.

18. The apparatus of claim 16 wherein said one code portion comprises the second butted code portion of said first expanded code.

19. The apparatus of claim 16 wherein said first and second codes comprise multibit digital codes of equal code length and wherein said second amplitude is greater than said first amplitude by a predetermined gain factor.

20. The method of claim 19 wherein said first and second digital codes comprise a pair of noise codes.

21. The apparatus of claim 20 wherein said first and second codes comprise digital noise codes which upon matched filter detection produces an impulse autocorrelation function.

22. The apparatus of claim 21 wherein said first and second noise codes are comprised of a pair of noise code mates which upon autocorrelation function detection and addition compress to a lobeless impulse and wherein said first and second expanded codes comprise a pair of equal length code mates which also compress to a lobeless impulse upon autocorrelation function detection.

23. The apparatus of claim 22 wherein said means generating said first expanded code includes means for delaying said second code of second amplitude by a time equal to the code length of said first and second codes to provide a delayed code and means for adding the delayed said second code of second amplitude to the end of said first code to provide thereby said first and second butted code portions of a first code mate, and wherein said means generating said second expanded code includes means for delaying said second code of first amplitude by a time delay equal to the code length of said first and second codes to provide a delayed code and means for adding the delayed said second code of first amplitude to the end of said first code of second amplitude to thereby provide said first and second butted code portions of a second code mate.

24. The apparatus of claim 23 wherein said one code portion of said first and second expanded codes comprises one of said delayed codes.

25. The apparatus of claim 24 wherein said one delayed code comprises the delayed code of said second expanded code.

26. The apparatus of claim 25 wherein said one delayed code comprises a delayed code of first amplitude.

27. The apparatus of claim 26 wherein said one code portion of said first and second expanded codes comprises the second code portion of said first expanded code.

28. The apparatus of claim 26 wherein said one code portion of said first and second expanded code comprises the second code portion of said second expanded code.

29. The apparatus of claim 28 wherein said second code portion of said second expanded code is of said second amplitude.

30. The apparatus of claim 22 wherein said means generating said first expanded code includes means for delaying said first code of first amplitude by a time delay equal to the length of said first and second codes and means for adding the delayed said first code of first amplitude to the end of said second code of said second amplitude to provide thereby said first and second code butted code portions of a first code mate, and wherein said means generating said second expanded code includes means for delaying said first code of second amplitude by a time delay equal to the code length of said first and second codes and means for adding the delayed said first code of second amplitude to the end of said second code of first amplitude providing thereby said first and second butted code portions of a second code mate.

* * * * *